United States Patent
Thomson

(10) Patent No.: US 8,599,793 B2
(45) Date of Patent: Dec. 3, 2013

(54) TROUBLESHOOTING CLIENT ROAMING

(75) Inventor: Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 12/769,095

(22) Filed: Apr. 28, 2010

(65) Prior Publication Data

US 2011/0267953 A1    Nov. 3, 2011

(51) Int. Cl.
*H04W 4/00*    (2009.01)
*H04W 24/00*   (2009.01)

(52) U.S. Cl.
USPC ............ 370/331; 370/338; 455/436; 455/456

(58) Field of Classification Search
None
See application file for complete search history.

(56) References Cited

U.S. PATENT DOCUMENTS

| | | |
|---|---|---|
| 7,590,418 B1 | 9/2009 | Thomson |
| 2004/0137917 A1 | 7/2004 | Ohto et al. |
| 2009/0080381 A1 * | 3/2009 | Yashar et al. ................. 370/331 |
| 2009/0161626 A1 * | 6/2009 | Crawford et al. ............. 370/331 |
| 2009/0232021 A1 | 9/2009 | Bachmutsky |
| 2010/0279695 A1 * | 11/2010 | Amirijoo et al. .............. 455/438 |
| 2011/0134880 A1 * | 6/2011 | Ait-Ameur et al. ........... 370/331 |
| 2012/0071166 A1 * | 3/2012 | Enzmann ...................... 455/438 |

FOREIGN PATENT DOCUMENTS

WO    WO 02/41587 A2    5/2002

OTHER PUBLICATIONS

PCT/US11/29701 International Search Report and the Written Opinion of the International Searching Authority Nov. 10, 2011.
PCT/US11/29701 International Preliminary Report on Patentability and Written Opinion of the International Searching Authority dated Nov. 8, 2012.

* cited by examiner

*Primary Examiner* — Marcus R Smith
(74) *Attorney, Agent, or Firm* — Tucker Ellis LLP

(57) ABSTRACT

In an example embodiment, a service that analyzes location information of a client as the client roams. For example, whenever a trigger event occurs, such as a change in the association state, a change in Internet Protocol (IP) address, etc., a determination is made whether the event was expected. If the event was not expected, the location of where the trigger event occurred can be determined enabling a network administrator to investigate roaming problems at a particular location.

13 Claims, 3 Drawing Sheets

TROUBLESHOOTING CLIENT ROAMING

TECHNICAL FIELD

The present disclosure relates generally to client roaming.

BACKGROUND

A problem with many WiFi network environments is that client roaming across access points (APs) is sporadic. With the introduction of wireless networking environments where controller functionality is being split across the access edge network switch, client roaming problems are likely to be even more prevalent.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
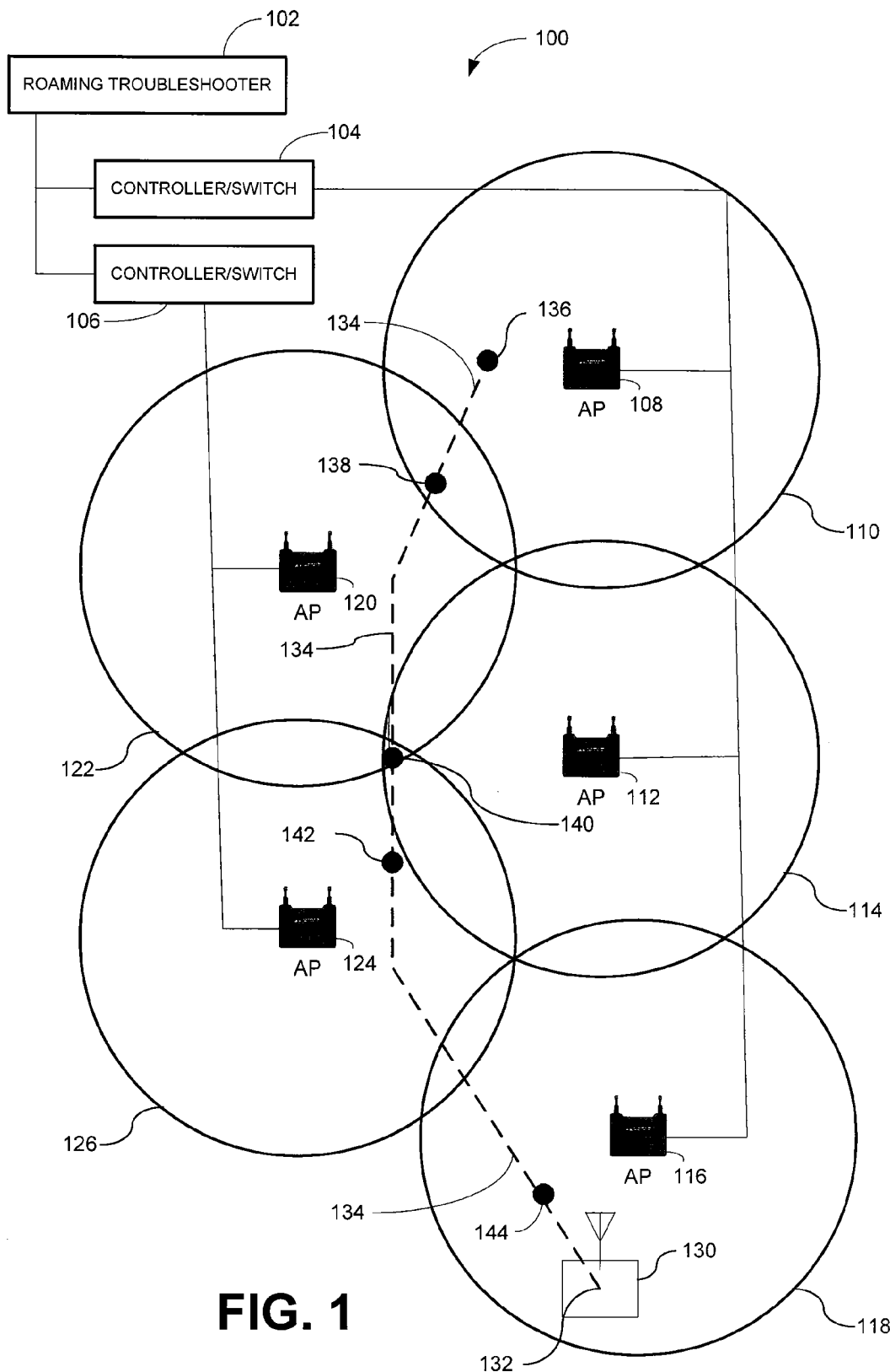
FIG. 1 illustrates an example of a wireless network employing a roaming troubleshooter.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus configured for analyzing roaming activity in response to movement by a wireless device. The apparatus comprises an interface operable to receive data and logic coupled to the interface and operable to analyze the received data. The logic is operable to determine from received data whether a mobile device has changed location from a first location to a second location, and whether an association state for the mobile device should have changed while the mobile device moved to the second location.

In accordance with an example embodiment, there is disclosed herein a method for analyzing roaming activity in response to a change in association state by a wireless device. The method comprises determining an association state has changed for a mobile device, and determining a current location for the mobile device. The method determines whether the association state should have changed based on the current location for the mobile device.

In accordance with an example embodiment, there is disclosed herein logic encoded in at least one tangible media and when executed by a processor operable to analyze roaming activity in response to a change in a wireless device's IP address. The logic determines that an Internet Protocol address for a mobile device changed. The logic determines a location where the Internet Protocol address for the mobile device changed. The logic correlates the location where the Internet Protocol address for the mobile device changed with known Internet Protocol assignment boundaries to determine whether the change in Internet Protocol address was expected.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In accordance with an example embodiment, there is described herein a new service, a "Roaming Troubleshooter" which can be instantiated on a Mobility Service Engine (MSE) that integrates with location services to automatically analyze mobile wireless device (client) roaming information and determine whether client roaming problems exist. Client roaming analysis data may be provided to external devices via any suitable means such as a (Simple Object Access Protocol/Extensible Markup Language) SOAP/XML Application Program Interface (API).

In an example embodiment, the Roaming Troubleshooter is embodied in logic. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the Roaming Troubleshooter learns the positions of APs in an area. For example, the Roaming Troubleshooter may be pre-provisioned with location data for APs. The Roaming Troubleshooter determines the current attached controller for each AP through an AP monitoring service. The Roaming Troubleshooter also determines the (AAA (Authentication, Authorization, and Access) servers, SSIDs (service set identifiers), WLANs (wireless local area networks) and VLANs (virtual local area networks) currently configured on Controller/APs. This allows the Roaming Troubleshooting to determine a real time the mapping of networks and APs to controllers/switches.

In an example embodiment, as a client moves around an area, the Roaming Troubleshooter receives data from the controller and analyzes the physical location of the client as well as the client's associated state (associated or not and to which AP), security profile and other information, as well as the client's (Internet Protocol) IP address, WLAN and VLAN.

In an example embodiment, there are three events that cause the Roaming Troubleshooter to perform further analysis:

1) The client's location has changed.
2) The client's associated state changed (for example roaming, the client disassociated and associated to the same AP, and/or other parameters related to the client's associate state changed such as security parameters).
3) The client's IP address changed or refreshed (e.g., went from assigned to 0.0.0.0 and back to assigned).

Upon detection of any of those events, the Roaming Troubleshooter looks up the current location of the client and/or determines the historical physical location trail for the client for a predetermined time period (for example in the last 1 hour). The roaming path starts for example at Point A and ends at Point B. This period could be configurable depending on mobility in the environment. By combining the physical location information with the event information listed below the Roaming Troubleshooter can show the affected areas of the network and which clients were affected by failed roam events.

In an example embodiment, the roaming troubleshooter can monitor data being provided to the client. For example, the roaming troubleshooter may be aware that the client is receiving a constant video stream, and as the client roams the troubleshooter could monitor statistics of the traffic to see at what point, if at any, the traffic stops temporarily, or changes to another access point, and then relate that event to a location.

In an example embodiment, the Roaming Troubleshooter determines whether the client lost association state while the moving across the roaming path. For roaming paths, the assumption is that a client should never lose association state with at least one AP in the mobility domain. If the client lost association state and then regained it, then the location system would record an event with the location area where they lost and regained association state, the physical location(s) of the device while they remained unassociated and where they gained it again. This record can then be queried using the SOAP/XML API or sent asynchronously to interested management systems to provide a zone of failure where roams are failing.

In an example embodiment, the Roaming Troubleshooter analyzes the roaming path to determine whether the client should have changed association state as the client moved around an area. For example, if the client roamed from one AP to another, what was the change (if any) of the client's physical location. An analysis can be performed to determine whether a roam was expected at the client's location. If a roam was not expected, then record a problem. If a client did not change location, this may indicate a potential problem that too much roaming is occurring. The Roaming Troubleshooter can record the roaming event. If the client's location did change, the Roaming Troubleshooter can determine whether the roam was expected based on AP coverage and the client's physical location at the time of the roam. If a roam was not expected, then the roam can be recorded as a roaming event that management systems can query or receive asynchronously.

In an example embodiment, the Roaming Troubleshooter analyzes the roaming path to determine whether the Internet Protocol (IP) address for the client should have changed as client moved on the roaming path. If the client IP address changed, the Roaming Troubleshooter determines the physical location where the occurred and correlates the location with IP assignment boundaries. The IP assignment boundaries can be determined based on the known configuration of APs, and therefore, controllers the client roamed across can be determined. The Roaming Troubleshooter knows which VLANs, WLANs AAA, servers, etc are assigned to each controller, and is therefore able to determine if an IP address change was expected. In particular embodiments, the Roaming Troubleshooter would determine based on AP/Controller mappings at the time, which SSID was being used, which VLAN and which AAA server. If the IP address change (or refresh where a client gets a new IP address that was the same as before) that occurred was expected then no event record is recorded. If, however, the IP address change and/or refresh occurred was not expected, an event record is generated.

In an example embodiment, the Roaming Troubleshooter determines whether other devices may have been affected by lost association, roam events, or IP address changes at the same time and/or same (or a nearby) location as the originating device that cause the analysis trigger to fire. Combining the location data devices that had the same problem allows network managers to visualize the full impact of an error that may have cause the roam to occur at a particular location.

In an example embodiment, the Roaming Troubleshooter correlates the historical information of roam events over time for a physical location and/or area (such as a floor/conference room, and/or area within the floor) to determine whether roaming problems occur more often at particular locations. This analysis can be performed using aggregated client data or data for a particular client.

FIG. 1 illustrates an example of a wireless network 100 employing a roaming troubleshooter 102. In the illustrated example roaming troubleshooter 102 is coupled to a first controller and/or switch (controller/switch) 104 and a second controller/switch 104. In an example embodiment, controller/switch 104 is associated with a first network and controller/switch 106 is associated with a second network.

In the illustrated example, controller/switch 104 is coupled to access point (AP) 108 with a coverage area illustrated by circle 110, AP 112 with a coverage area illustrated by circle 114, and AP 116 with a coverage area illustrated by circle 118. Controller/switch 106 is coupled to AP 120 with a coverage area illustrated by circle 122, and AP 124 with a coverage area illustrated by circle 126.

For purposes of illustration, a wireless device 130 is illustrated at location 132. For the examples described herein wireless device 130 traveled along path 134 although those skilled in the art should readily appreciate that wireless device 130 may travel any path. In this example, wireless device is associated with AP 108 at location 136, AP 120 at location 138, one of APs 112, 120, 124 at location 140, AP 124 at location 142, and AP 116 at location 134.

The number of controllers/switches, access points, networks, and clients illustrated in the example of FIG. 1 were chosen for illustrative purposes only. Those skilled in the art should readily appreciate that the roaming troubleshooter 102 can perform the functionality described herein with networks suitably comprising any physically realizable number of networks, controllers/switches, access points, and clients.

In operation, roaming troubleshooter 102 is operable to determine from received data whether device 130 has changed location. Roaming Troubleshooter 102 is operable to determine from data received from either controller/switch 104 and/or controller/switch 106 whether an association state for the mobile device should have changed while the mobile device moved to the second location. For example, while mobile device 130 moves form location 136 to location 138 the association state may not change; however, by the time mobile device 130 reaches location 140 the association state should have changed. If the association state has not changed this would indicate a roaming error has occurred. Roaming Troubleshooter 102 may log the error and/or transmit data representative of the error to another device (not shown).

In an example embodiment, roaming troubleshooter 102 is operable to determine from received data that the mobile device roamed from a first access point to a second access point, and is further operable to determine whether the association state for the mobile device should have changed based on whether data whether the second access point is appropriate for the second location.

For example, if while moving from location 134 to location 138 mobile device 130 changes association from AP 108 to AP 120, roaming troubleshooter 102 can determine whether AP 120 is appropriate for location 138. Since location 138 is within AP 120's coverage area 112, the roam from AP 108 to AP 120 can be expected.

If, however, while moving from location 134 to location 138 mobile device 130 changes association from AP 108 to AP 112, roaming troubleshooter 102 determines Since location 138 is outside of AP 112's coverage area 114, and that while at location 138 mobile device 130 should be associated with either AP 108 or AP 120. Therefore, roaming troubleshooter 102 determines a roaming error occurred. Roaming Troubleshooter 102 may log the error and/or transmit data representative of the error to another device (not shown).

In an example embodiment, roaming troubleshooter 102 is operable to determine from received data that mobile device 130 has remained associated with a first access point while moving from the first location and the second location. Roaming troubleshooter 102 determines whether the association state for the mobile device should have changed based on the change in location. For example, if while mobile device moves from location 142 to location 144 and remains associated with AP 124, roaming troubleshooter 102 can determine that a roaming error occurred as mobile device 130 should be associated with AP 116 while at location 144. Roaming Troubleshooter 102 may log the error and/or transmit data representative of the error to another device (not shown).

In an example embodiment, roaming troubleshooter 102 is operable to determine the association state for the mobile device should not have changed if the mobile device has not moved from a current location. For example, if while at location 142 mobile device 130 changes association from AP 124 to AP 120 (or any other of the APs 108, 112, 116 illustrated in the example), this would indicate a roaming error occurred. In particular embodiments, roaming troubleshooter 102 may determine a roaming error occurred even if mobile device 130 roamed while in the coverage area of the new AP. For example, if while at location 140 (which is within coverage area 122 of AP 120, coverage area 114 of AP 112 and coverage area 126 of AP 124) mobile device 130 is associated with AP 112, and without moving changes association to either AP 120 or AP 112, roaming troubleshooter 102 determines a roaming error occurred. Roaming Troubleshooter 102 may log the error and/or transmit data representative of the error to another device (not shown).

In an example embodiment, is responsive to receiving data indicating that an Internet Protocol (IP) address for mobile device 130 was changed or refreshed, to determine whether the change was appropriate based on mobile device 130's current location or based on the path mobile device 130 took from one location to the next. For example, roaming troubleshooter 102 upon detecting that the IP address for mobile device 130 changed, determines that mobile device 130 moved along path 138 from location 142 to 144. Because location 142 is within coverage area 126 of AP 124 which is associated with controller/switch 106 while location 144 is within coverage area 118 of AP 116 associated with controller 104, the change in IP address can be expected. If for example, mobile device 130 changed or refreshed its IP address and while mobile device 130 moved form location 144 to location 132, both of which are within coverage area 118 of AP 116, roaming troubleshooter 102 can determine that a roaming error occurred. Roaming Troubleshooter 102 may log the error and/or transmit data representative of the error to another device (not shown). Alternatively, if while mobile device 130 moves from location 144 to location 132 the IP address of mobile device 130 does not change, roaming troubleshooter 102 determines that no roaming error occurred. However, if mobile device moves from location 142 to location 144 and the IP address does not change, roaming troubleshooter 102 determines a roaming error occurred. Roaming Troubleshooter 102 may log the error and/or transmit data representative of the error to another device (not shown).

In an example embodiment, roaming troubleshooter 102 is operable to correlate association state changes for a plurality of mobile devices by time. For example, if an unusual number of association state changes take place at a certain time, e.g. a particular time of day, roaming troubleshooter 102 can determine that there is a potential roaming problem. Roaming Troubleshooter 102 may log the error and/or transmit data representative of the error to another device (not shown).

In an example embodiment, roaming troubleshooter 102 is operable to correlate association state changes for a plurality of mobile devices by location. The correlation may be performed over a predetermined time period. If a particular location has an unusual number of roams during the predetermined time period, roaming troubleshooter 102 and determine that there is a potential roaming problem. Roaming Troubleshooter 102 may log the error and/or transmit data representative of the error to another device (not shown).

Figure 2:
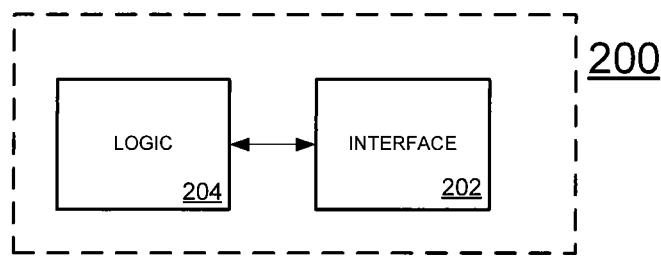
FIG. 2 illustrates an example block diagram of a roaming troubleshooter.

FIG. 2 illustrates an example block diagram of a roaming troubleshooter 200. Roaming troubleshooter 200 is suitable for implementing the functionality of roaming troubleshooter 102 described supra in FIG. 1. Roaming troubleshooter 200 comprises an interface 202 and logic 204. Interface 202 is suitable for receiving data from external devices such as switches/controllers, APs, etc. In particular embodiments, interface 202 is also operable to transmit data to external devices via a network. Logic 204 is operable to analyze the data received via interface 202 to determine whether roaming problems are being encountered.

For example, referring to FIG. 1 with continued reference to FIG. 2, logic 204 is operable to determine from data received via interface 202 whether device 130 has changed location. Logic 204 is operable to determine from data received from either controller/switch 104 and/or controller/switch 106 via interface 202 whether an association state for the mobile device should have changed while the mobile device moved to the second location. For example, while mobile device 130 moves form location 136 to location 138 the association state may not change; however, by the time mobile device 130 reaches location 140 the association state should have changed. If the association state has not changed this would indicate a roaming error has occurred. Logic 204 may log the error and/or transmit data representative of the error to another device (not shown).

In an example embodiment, logic 204 is operable to determine from data received via interface 202 that the mobile device roamed from a first access point to a second access point, and is further operable to determine whether the association state for the mobile device should have changed based on whether data whether the second access point is appropriate for the second location.

For example, if while moving from location 134 to location 138 mobile device 130 changes association from AP 108 to AP 120, logic 204 can determine whether AP 120 is appropriate for location 138. Since location 138 is within AP 120's coverage area 112, the roam from AP 108 to AP 120 can be expected.

If, however, while moving from location 134 to location 138 mobile device 130 changes association from AP 108 to AP 112, logic 204 determines Since location 138 is outside of AP 112's coverage area 114, and that while at location 138 mobile device 130 should be associated with either AP 108 or AP 120. Therefore, logic 204 determines a roaming error occurred. Logic 204 may log the error and/or transmit via interface 202 data representative of the error to another device (not shown).

In an example embodiment, logic 204 is operable to determine from data received via interlace 202 that mobile device 130 has remained associated with a first access point while moving from the first location and the second location. Logic 204 determines whether the association state for the mobile device should have changed based on the change in location. For example, if while mobile device moves from location 142 to location 144 and remains associated with AP 124, logic 204 can determine that a roaming error occurred as mobile device 130 should be associated with AP 116 while at location 144. Logic 204 may log the error and/or transmit via interface 202 data representative of the error to another device (not shown).

In an example embodiment, logic 204 is operable to determine the association state for the mobile device should not have changed if the mobile device has not moved from a current location. For example, if while at location 142 mobile device 130 changes association from AP 124 to AP 120 (or any other of the APs 108, 112, 116 illustrated in the example), this would indicate a roaming error occurred. In particular embodiments, logic 204 may determine a roaming error occurred even if mobile device 130 roamed while in the coverage area of the new AP. For example, if while at location 140 (which is within coverage area 122 of AP 120, coverage area 114 of AP 112 and coverage area 126 of AP 124) mobile device 130 is associated with AP 112, and without moving changes association to either AP 120 or AP 112, logic 204 determines a roaming error occurred. Logic 204 may log the error and/or transmit via interface 202 data representative of the error to another device (not shown).

In an example embodiment, logic 204 is responsive to receiving data via interface 202 indicating that an Internet Protocol (IP) address for mobile device 130 was changed or refreshed, to determine whether the change was appropriate based on mobile device 130's current location or based on the path mobile device 130 took from one location to the next. For example, logic 204 upon detecting that the IP address for mobile device 130 changed, determines that mobile device 130 moved along path 138 from location 142 to 144. Because location 142 is within coverage area 126 of AP 124 which is associated with controller/switch 106 while location 144 is within coverage area 118 of AP 116 associated with controller 104, the change in IP address can be expected. If for example, mobile device 130 changed or refreshed its IP address and while mobile device 130 moved form location 144 to location 132, both of which are within coverage area 118 of AP 116, logic 204 can determine that a roaming error occurred. Logic 204 may log the error and/or transmit data representative of the error to another device (not shown). Alternatively, if while mobile device 130 moves from location 144 to location 132 the IP address of mobile device 130 does not change, logic 204 determines that no roaming error occurred. However, if mobile device moves from location 142 to location 144 and the IP address does not change, logic 204 determines a roaming error occurred. Logic 204 may log the error and/or transmit via interface 202 data representative of the error to another device (not shown).

In an example embodiment, logic 204 is operable to correlate association state changes for a plurality of mobile devices by time. For example, if an unusual number of association state changes take place at a certain time, e.g. a particular time of day, logic 204 can determine that there is a potential roaming problem. Logic 204 may log the error and/or transmit via interface 202 data representative of the error to another device (not shown).

In an example embodiment, logic 204 is operable to correlate association state changes for a plurality of mobile devices by location. The correlation may be performed over a predetermined time period. If a particular location has an unusual number of roams during the predetermined time period, logic 204 can determine that there is a potential roaming problem. Logic 204 may log the error and/or transmit via interlace 202 data representative of the error to another device (not shown).

Figure 3:
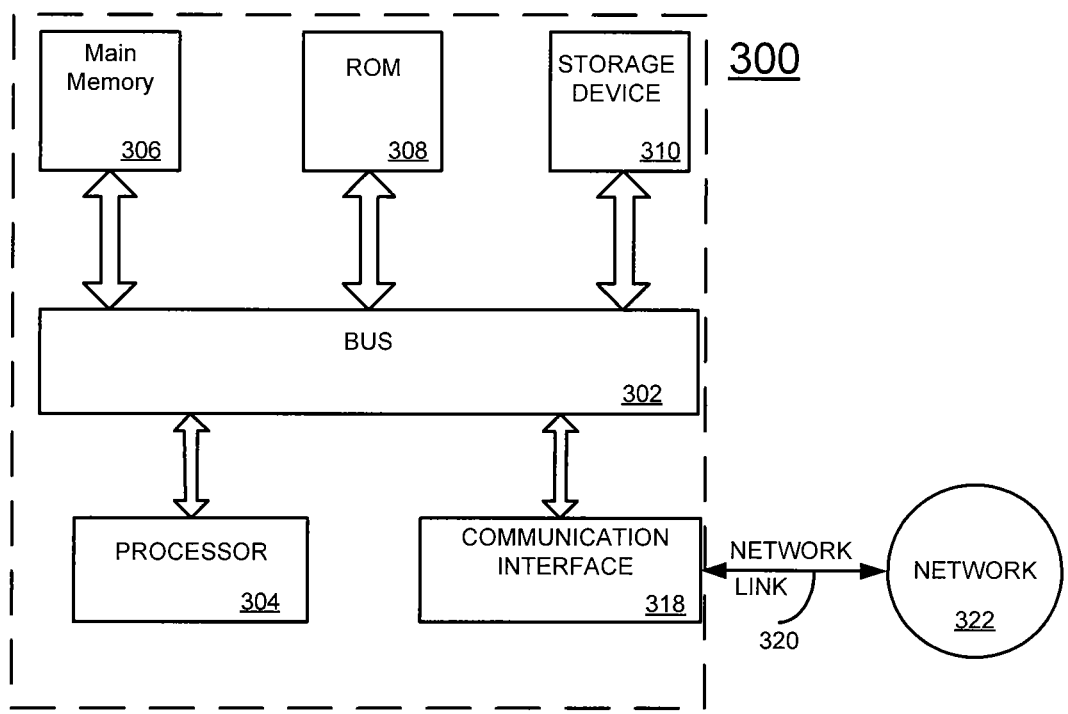
FIG. 3 illustrates an example of a computer system upon which an example embedment may be implemented.

FIG. 3 illustrates an example of a computer system 300 upon which an example embedment may be implemented. For example, computer system 300 may be employed to implement the functionality of roaming troubleshooter 102 (FIG. 1) or logic 204 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for troubleshooting mobile device roaming. According to an example embodiment, troubleshooting mobile device roaming is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, and volatile media. Non-volatile media include for example optical or magnetic disks, such as storage device 310. Volatile media include dynamic memory such as main memory 306. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication coupling computer system 300 to a network link 320 that is connected to network 322. This allows computer system 300 to acquire data from external devices such as controllers/switches, APs, etc. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

Computer system 300 can send messages and receive data, including program codes, through the network(s), network link 320, and communication interface 318. In accordance with an example embodiment, a downloaded application provides the program code for troubleshooting mobile device roaming as described herein.

Figure 4:
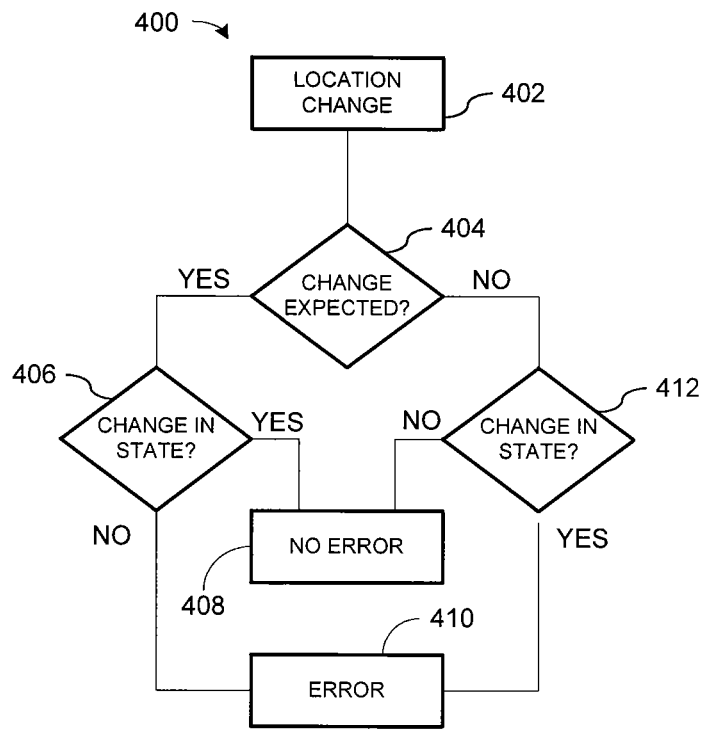
FIG. 4 illustrates an example of a methodology for analyzing roaming activity in response to movement by a wireless device.
Figure 5:
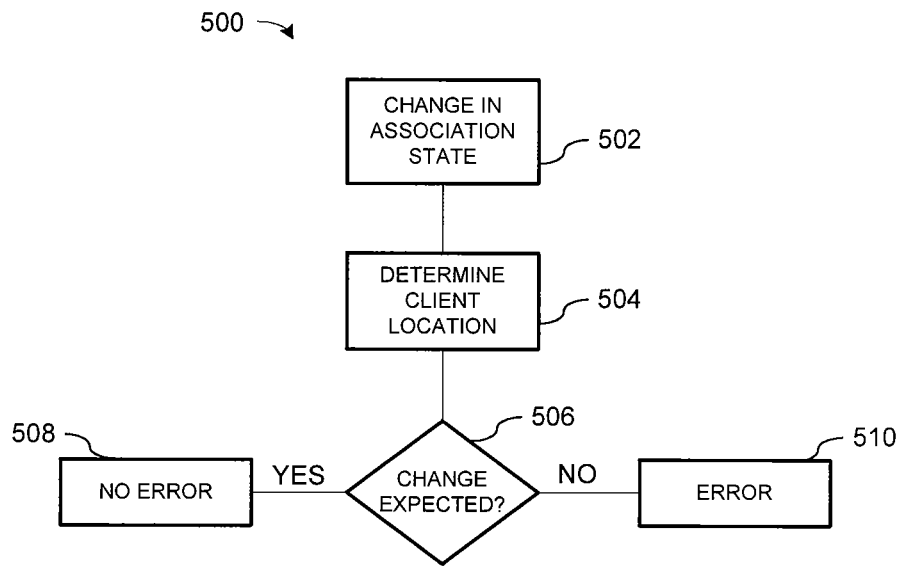
FIG. 5 illustrates an example methodology for analyzing roaming activity in response to a change in association state by a wireless device.

In view of the foregoing structural and functional features described above, methodologies in accordance with example embodiments will be better appreciated with reference to FIGS. 4 and 5. While, for purposes of simplicity of explanation, the methodologies of FIGS. 4 and 5 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement the methodologies described herein. The methodologies described herein are suitably adapted to be implemented in hardware, software, or a combination thereof.

FIG. 4 illustrates an example of a methodology 400 for analyzing roaming activity in response to movement by a wireless device. Methodology 400 may be implemented by roaming troubleshooter 102 (FIG. 1), logic 204 (FIG. 2) and/or computer system 300 (FIG. 3).

At 402, a location change for a mobile device is determined. The change may be detected based on data received from an access point, controller, switch, etc. At 404, an inquiry is made to determine whether an association state change was expected. State changes may include, but are not limited to, a change in the associated AP and/or IP address of the mobile device.

If, at 404, an association state change was expected (YES), at 406 a determination is made whether the association state changed. If the association state changed, and in particular embodiments whether the change was correct, e.g., to an appropriate AP or an appropriate IP address, (YES), the roam was expected and no error is detected as indicated at 408. If, however, at 406, a determination is made that no change was made when a change was expected, or in particular embodiments the change was not correct, e.g., to the wrong AP or an incorrect IP address, (NO), at 406 an error condition is determined as indicated at 410. In an example embodiment, a log entry of the error is generated and/or a message with data representative of the error condition is transmitted.

If, at 404, a change in the association state was not expected (NO), at 412 a determination is made whether there was a change in state. If, at 412, a determination is made that no change in association state occurred (NO), then no error is detected as indicated by 408. If, however, at 412, a determination was made that the association state changed (when a change was not expected as referenced at 404) (NO), an error condition is indicated at 410. In an example embodiment, a log entry of the error is generated and/or a message with data representative of the error condition is transmitted.

FIG. 5 illustrates an example methodology 500 for analyzing roaming activity in response to a change in association state by a wireless device. Methodology 500 may be implemented by roaming troubleshooter 102 (FIG. 1), logic 204 (FIG. 2) and/or computer system 300 (FIG. 3).

At 502, a change in the association state of a mobile device is determined. Any number of techniques may be employed to determine a change in the association state. For example, a change in the association state may be determined by determining a mobile device lost association and/or re-associated, roamed to a new access point, disassociated and re-associated with the same access point and/or changed or refreshed its IP address.

At 504, the location of the mobile device is determined. In an example embodiment, the path or known locations that a mobile device traveled over a predetermined time period is also determined. For example, if a mobile device lost association and later re-associated the locations where association was lost and were re-association occurred are determined.

At 506, a determination is made whether the change in association state was expected. For example, if the mobile device lost association, a determination is made whether lost association was expected because the device was no longer within a coverage area provided by the network. As another example, if a mobile device roamed from a first AP to a second AP, a determination is made whether the mobile device should have remained associated with the first AP. Still another example, if a mobile device roamed from a first AP to a second AP, did the mobile device move to a new location. Yet another example, if a mobile device changed or refreshed its IP address, a determination may be made whether the IP address should have changed or been refreshed based on the location or path taken by the mobile device.

If at 506 the change in association state was expected (YES), no error is detected as indicated by 508. If, however, at 506 the change in association state was not expected (NO), an error condition is determined as indicated by 510. A log entry may be generated and/or a message with data representative of the error condition is transmitted.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. Logic encoded in at least one non-transitory media for execution and when executed operable to:
   determine that an Internet Protocol address for a mobile device changed;
   determine a location where the Internet Protocol address for the mobile device changed in accordance with stored device position data; and
   correlate the location where the Internet Protocol address for the mobile device changed with known Internet Protocol assignment boundaries associated with a plurality of wireless access points to determine whether the change in Internet Protocol address was expected.

2. The logic of claim 1, wherein the logic determines that the Internet Protocol address for a mobile device has changed responsive to determining the Internet Protocol address was refreshed.

3. The logic of claim 1, wherein the logic when executed is further operable to:
   determine from the stored data whether the mobile device has changed location from a first location to a second location in accordance with the change in Internet Protocol address;
   determine which of the plurality of wireless access points is properly associated with the mobile device at the second location; and
   determine from the stored data device position whether an association state for the mobile device should have changed while the mobile device changed location from the first location to the second location in accordance with a current association state of the mobile device and the second location.

4. The logic of claim 3, wherein the logic is operable to:
   determine from the stored device position data that the mobile device roamed from a first access point to a second access point; and
   determine whether the association state for the mobile device should have changed based on whether the second access point is appropriate for the second location.

5. The logic of claim 4, wherein the logic is further operable to transmit via an associated interface data indicating an error condition occurred responsive to determining the second access point is inappropriate for the second location.

6. The logic of claim 3, wherein the logic is operable to:
   determine from the stored device position data that the mobile device has remained associated with a first access point while moving from the first location to the second location; and
   determine whether the association state for the mobile device should have changed.

7. The logic of claim 6, wherein the logic is operable to transmit via an associated interface data indicating an error condition occurred responsive to determining the mobile device should have roamed to a second access point while moving to the second location.

8. The logic of claim 3, wherein the logic is operable to determine the association state for the mobile device should not have changed responsive to determining the mobile device has not moved from a current location.

9. The logic of claim 3, wherein the logic is operable to:
   determine whether the association state for the mobile device should have changed based on determining the Internet Protocol address for the mobile device changed; and
   determine from stored device position data whether the Internet Protocol address should have changed while moving to a second location.

10. The logic of claim 9, wherein the logic is operable to transmit via an associated interface data indicating an error condition occurred responsive to determining the Internet Protocol address should have remained the same while moving to the second location.

11. The logic of claim 1, wherein the logic is operable to correlate changes of association states for a plurality of mobile devices at the same time.

12. The logic of claim 1, wherein the logic is operable to correlate changes of association states for a plurality of mobile devices at the same location.

13. The logic of claim 1, wherein the logic is operable to correlate roam events for a location over a time period to determine whether roaming errors are occurring at the location.

* * * * *